(12) United States Patent
Miyamura

(10) Patent No.: US 7,492,546 B1
(45) Date of Patent: Feb. 17, 2009

(54) PROVIDING PRE-DETERMINED SERVO POSITION CORRECTION VALUES FOR USE DURING DISK DRIVE INITIALIZATION

(75) Inventor: Masao Miyamura, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 69 days.

(21) Appl. No.: 11/762,620

(22) Filed: Jun. 13, 2007

(51) Int. Cl.
*G11B 5/596* (2006.01)
(52) U.S. Cl. .................................. 360/77.04; 360/77.06
(58) Field of Classification Search ........................ None
See application file for complete search history.

(56) References Cited

U.S. PATENT DOCUMENTS

| | | | |
|---|---|---|---|
| 5,339,206 A * | 8/1994 | Takahashi | 360/75 |
| 6,421,198 B1 | 7/2002 | Lamberts et al. | |
| 6,798,606 B2 | 9/2004 | Tang et al. | |
| 6,937,424 B2 | 8/2005 | Chang et al. | |
| 6,995,941 B1 | 2/2006 | Miyamura et al. | |
| 7,139,150 B2 | 11/2006 | Spaur et al. | |
| 7,286,316 B2 * | 10/2007 | Sai et al. | 360/75 |
| 7,391,584 B1 * | 6/2008 | Sheh et al. | 360/51 |

* cited by examiner

*Primary Examiner*—Jason C Olson
(74) *Attorney, Agent, or Firm*—Blakely, Sokoloff, Taylor & Zafman

(57) ABSTRACT

A disk drive comprising a moveable head, a disk, and a servo controller to control track following operations is disclosed. The disk includes a plurality of tracks in which a substantial majority of the tracks include a plurality of servo sectors utilized in track following operations. The servo controller implements a program during power-up to: calculate servo position correction values using a set of servo position correction coefficients that have been pre-selected for the disk drive based upon the class of disk drive in which the set of servo position correction coefficients have been coded into the program; store the servo position correction values in a pre-determined servo position correction look-up table in memory; and utilize the pre-determined servo bursts correction look-up table to track follow on a reserved track of the disk.

23 Claims, 7 Drawing Sheets

PROVIDING PRE-DETERMINED SERVO POSITION CORRECTION VALUES FOR USE DURING DISK DRIVE INITIALIZATION

BACKGROUND OF THE INVENTION

1. Field of the Invention

The invention relates to disk drives. More particularly, the invention relates to providing pre-determined servo position correction values for use during disk drive initialization to improve track following on a reserved track of a disk.

2. Description of the Related Art

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input.

Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk. Further, position error signals (PESs) are often utilized as a feedback signal for the servo control system during track following operations. The PES signal may be derived from read servo bursts as the head flies over the servo bursts of the servo sectors of the disk. The PES signal may be utilized by the servo control system to keep the head near the center of the track.

As disk drive manufacturers have been forced to increase data capacity in disk drives to remain competitive, a greater number of tracks are now provided on each disk for data storage. In order to accomplish this, the width of the tracks have been made increasingly smaller and the servo bursts used to maintain track following operations are now increasingly spaced closer and closer together. Consequently, servo control margins for track following have likewise become increasingly more stringent and more sensitive to error.

With increasingly narrower tracks and tighter servo control margins, one area of concern arises during disk drive initialization and power-up. As is well known, in many of today's disk drives, diagnostic and calibration functions are performed during initialization and power-up with the aid of specialized reserved tracks. Typically, reserved tracks are located at the outer diameter of a disk of a disk drive. However, reserved tracks may also be located at the inner diameter of the disk. Reserved tracks may be utilized by the servo control system of the disk drive during calibration.

Although position linearity compensation is sometimes used in track following in disk drives, disk drives presently do not employ position linearity compensation when track following on the reserved track to read calibration data and initialize the disk drive. Further, although disk drives may create a calibrated compensation table during the calibration process for the disk drive, due to the increasingly stringent servo control margins resulting from narrower tracks and more closely spaced servo bursts, off-track gain variations may occur that prevent the disk drive from effectively track-following on the reserved track to read any calibrated linearity compensation parameters for the servo system, thereby detrimentally affecting the initialization process and even causing disk drive failure.

SUMMARY OF THE INVENTION

In one embodiment of the invention, a method for providing pre-determined servo position correction values for use in initializing a disk drive is disclosed. The method comprises: selecting a set of servo position correction coefficients for a class of disk drives and coding firmware for the class of disk drives with the selected set of servo position correction coefficients. During a power-up for a disk drive from the class of disk drives, the method further comprises: calculating servo position correction values using the selected set of servo position correction coefficients; storing the servo position correction values in a pre-determined servo position correction look-up table in memory; and utilizing the pre-determined servo position correction look-up table to track follow on a reserved track of the disk drive.

In another embodiment of the invention, a disk drive comprising a moveable head, a disk, and a servo controller to control track following operations is disclosed. The disk includes a plurality of tracks in which a substantial majority of the tracks include a plurality of servo sectors utilized in track following operations. The servo controller implements a program during power-up to: calculate servo position correction values using a set of servo position correction coefficients that have been pre-selected for the disk drive based upon the class of disk drive in which the set of servo position correction coefficients have been coded into the program; store the servo position correction values in a pre-determined servo position correction look-up table in memory; and utilize the pre-determined servo bursts correction look-up table to track follow on a reserved track of the disk.

In yet another embodiment of the invention, a disk drive is disclosed that includes: a means for calculating and storing a pre-determined look up table in response to a set of predetermined coefficients for a class of disk drives in which the pre-determined look up table includes servo position correction values; a means for track following on a reserved track using the pre-determined look up table; and a means for creating an off-track gain profile for the disk drive and for creating a calibrated look up table in response to the off-track gain profile, the calibrated look up table comprising calibrated servo position correction values.

The foregoing and other features of the invention are described in detail below and are set forth in the appended claims.

DETAILED DESCRIPTION

Figure 1:
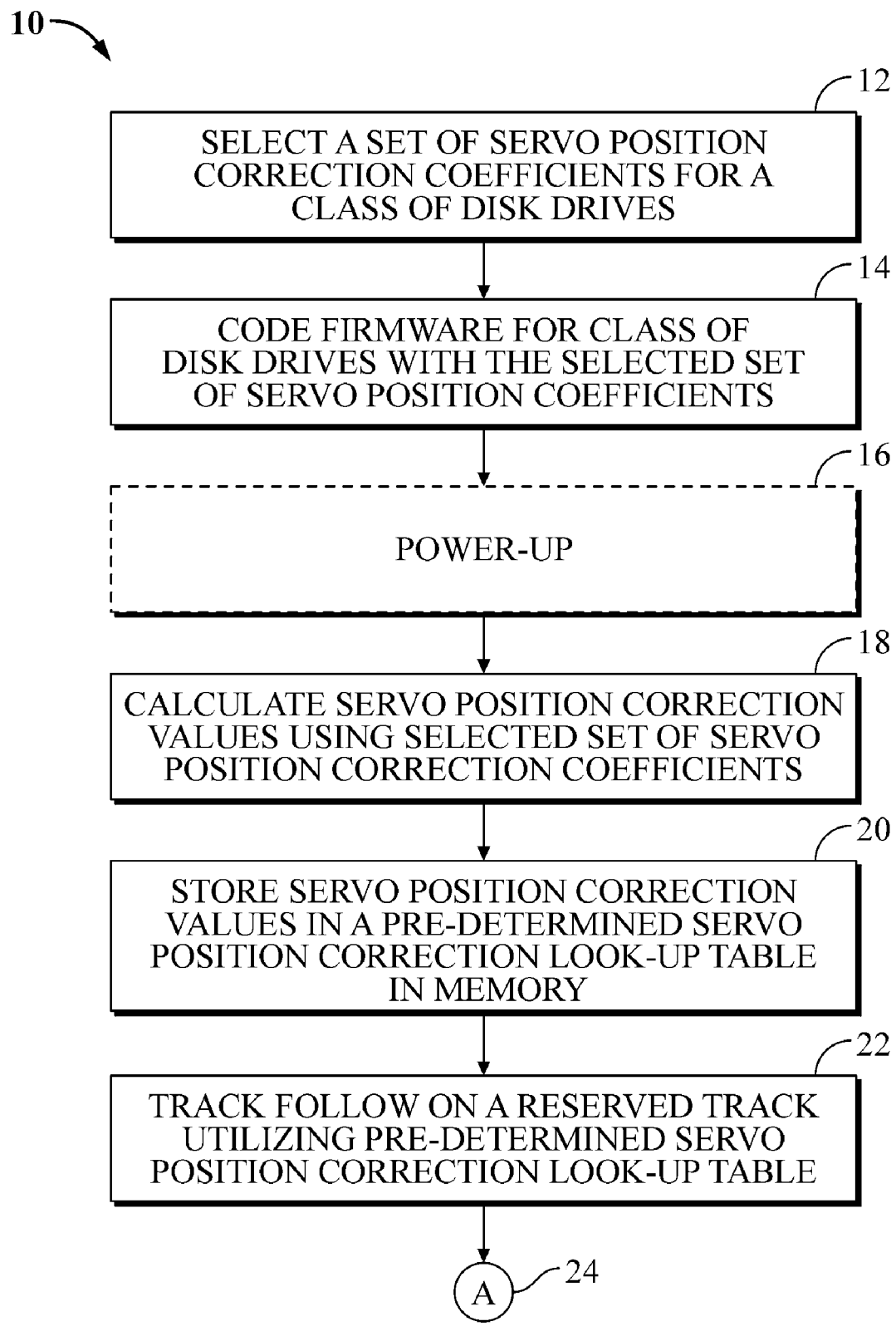
FIG. 1 is a flow diagram illustrating a process for providing and utilizing pre-determined servo position correction values for use in initializing a disk drive to improve track following on a reserved track of a disk, according to one embodiment of the invention.

FIG. 1 is a flow diagram illustrating a process 10 for providing and utilizing pre-determined servo position correction values for use in initializing a disk drive to improve track following on a reserved track of a disk. At block 12, a set of servo position correction coefficients is selected for a class of disk drives. This selection is based upon a characterization process that will be described in more detail later. Next, firmware or software for the class of disk drives is coded to include the selected set of servo position coefficients (block 14). Typically, the firmware or software is implemented by the servo controller of the disk drive.

When the disk drive is powered-up (block 16), servo position correction values are calculated using the selected set of servo position correction coefficients (block 18). The servo position correction values are then stored in a pre-determined servo position correction look-up table in memory of the disk drive (e.g., dynamic random access memory (DRAM)) (block 20).

The pre-determined servo position correction look-up table is then utilized by the servo controller of the disk drive to track follow on a reserved track of the disk drive (block 22). During disk drive power-up and initialization, a reserved track may be read to perform diagnostic and calibration functions. Typically, the reserved track is located at the outer diameter (OD) of the disk of the disk drive; however, reserved tracks may also be located at the inner diameter (ID) of the disk. The reserved track is typically utilized by the servo control system of the disk drive during disk drive power-up and initialization to read previously stored calibration results.

By utilizing the pre-determined servo position correction look-up table to initially track follow on a reserved track, off-track gain variation may be accounted for and position linearity improved such that the disk drive can effectively track follow on the reserved track to properly initialize the disk drive.

At point A (circle 24), process 10 moves forward to determine whether or not a calibrated servo position correction table is already present in the reserved track, as will be described in more detail later.

Figure 2:
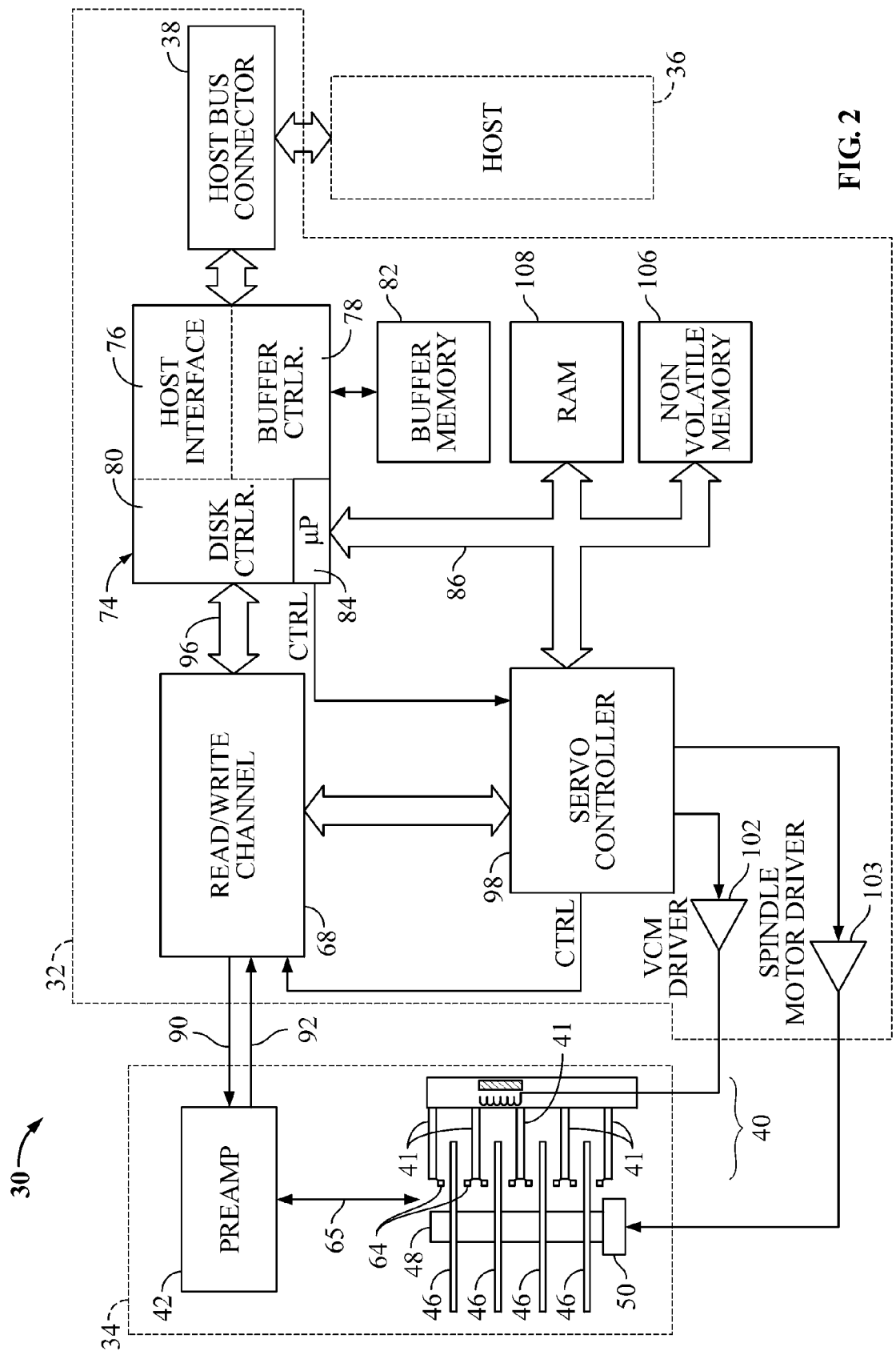
FIG. 2 shows a simplified block diagram of a disk drive in which embodiments of the invention may be practiced.

FIG. 2 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for larger computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Servo controller 98 may operate under the control of a program or routine (e.g., firmware, software, etc.) to execute methods or processes in accordance with embodiments of the invention, as will be described in more detail later. These embodiments generally relate to servo control techniques for providing pre-determined servo position correction values for use during disk drive initialization to improve track following on a reserved track of disk 46. Microprocessor 84 may pre-program servo controller 98 and/or initialize the servo controller with initial and operational values for use in implementing these servo control techniques and may aid servo controller 98 in performing this functionality. Alternatively, microprocessor 84 may implement the servo control techniques.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Host initiated operations for reading and writing data in disk drive 30 are executed under control of microprocessor 84 of HIDC 74 which is connected to the controllers and memory arrays via bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Channel 68 may employ PRML (partial response maximum likelihood) coding techniques, although other coding processes may be utilized.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sectors (termed "servo sectors") are recorded on each track of each disk 46. Data sectors are recorded in the intervals between servo sectors on each track. Servo sectors are sampled at regular intervals by servo controller 98 to provide servo position information to microprocessor 84 to aid in seeking and track following operations. Servo sectors are received by channel 68, and are processed by servo controller 98, to provide position information to microprocessor 84 via bus 86. Each servo sector may include at least: a phase lock loop (PLL) field, a servo synch mark (SSM) field, a track identification (TKID) field, a sector identifier (ID), and a group of servo bursts, such as an alternating pattern of magnetic transitions, that the servo controller 98 samples to align the moveable transducer head with, and relative to, a particular track. Typically, servo controller 98 moves the transducer head 64 toward a desired track during a "seek" mode using the TKID field as a control input. As an example, in processing information, to ensure consistency in the detection of bits composing a block of bits, a phase lock loop (PLL) field may first be read in order to facilitate bit synchronization. Next, a servo synch mark may be read to facilitate block synchronization. A valid servo synchronization signal results in the read/write channel 68 of the disk drive 30 establishing a precise timing reference point for the reading of servo data and for read/write operations. A sector ID may be used as a binary encoded sector ID number to identify the sector.

Once the transducer head 64 is generally over a desired track, servo controller 98 may use the servo bursts to keep the transducer head 64 over the track in a "track follow" mode based upon demodulated PES values from the read servo bursts. During track following mode, the moveable transducer head 64 may repeatedly read the sector ID of each successive servo sector to obtain the binary encoded sector ID number that identifies each sector of the track. Based on the TKID and sector ID, servo controller 98 continuously knows where the head 64 is relative to the disk 46 and communicates this to microprocessor 84. In this way, microprocessor 84 continuously knows where the head 64 is relative to the disk and can command the movement of the head 64, via servo controller 98, to implement disk drive operations, such as seeking, tracking, read/write operations, etc.

Servo controller 98 may operate under the control of a program or routine to execute methods or processes relating to servo control techniques for providing pre-determined servo position correction values for use during disk drive power-up and initialization to improve track following on a reserved track of a disk. As previously described, servo controller 98 is generally responsible for commanding seeking and track following operations via the actuator assembly of HDA 34.

In particular, servo controller 98 may implement a program stored as firmware in servo controller 98 or non-volatile memory 106 (or at other locations) during power-up to calculate servo position correction values using a set of servo position correction coefficients that have been pre-selected for the disk drive based upon a characterized class of disk drives. The set of servo position correction coefficients are actually coded into the program. This set of servo position correction coefficients are pre-selected based upon an analysis and characterization of the class of disk drives to which the disk drive is associated to minimize off-track gain variations. These servo position correction values are then stored in a pre-determined servo position correction look-up table in memory, such as random access memory (RAM) 108. For example, RAM 108 may be dynamic random access memory (DRAM).

In particular, servo controller 98 utilizes the pre-determined servo position correction look-up table to track follow on a reserved track of a disk 46 during power-up and initialization. By utilizing a predetermined servo position correction look-up table, large off-track gain variations may be accounted for such that servo controller 98 can effectively track follow on the reserved track to successfully perform disk drive initialization. In particular, this can occur before any calibrated linearity compensation parameters are loaded into servo controller 98.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The processor readable or accessible medium may include data that, when accessed by a processor or circuitry, cause the processor circuitry to perform the operations and processes described herein. The term "data" herein refers to any type of information that is encoded for machine-readable purposes. Therefore, it may include programs, code, data, files, etc.

As previously described, a set of servo position correction coefficients are selected for a class of disk drives. This is based upon a characterization of the class of disk drives. In particular, common characteristics for a class of disk drives are typically measured by disk drive designers. Off-track gain variation may be measured for a class of disk drives and servo position correction coefficients may be determined to compensate for the off-track gain variation for the class of disk drives, according to one embodiment of the invention.

Figure 3A:
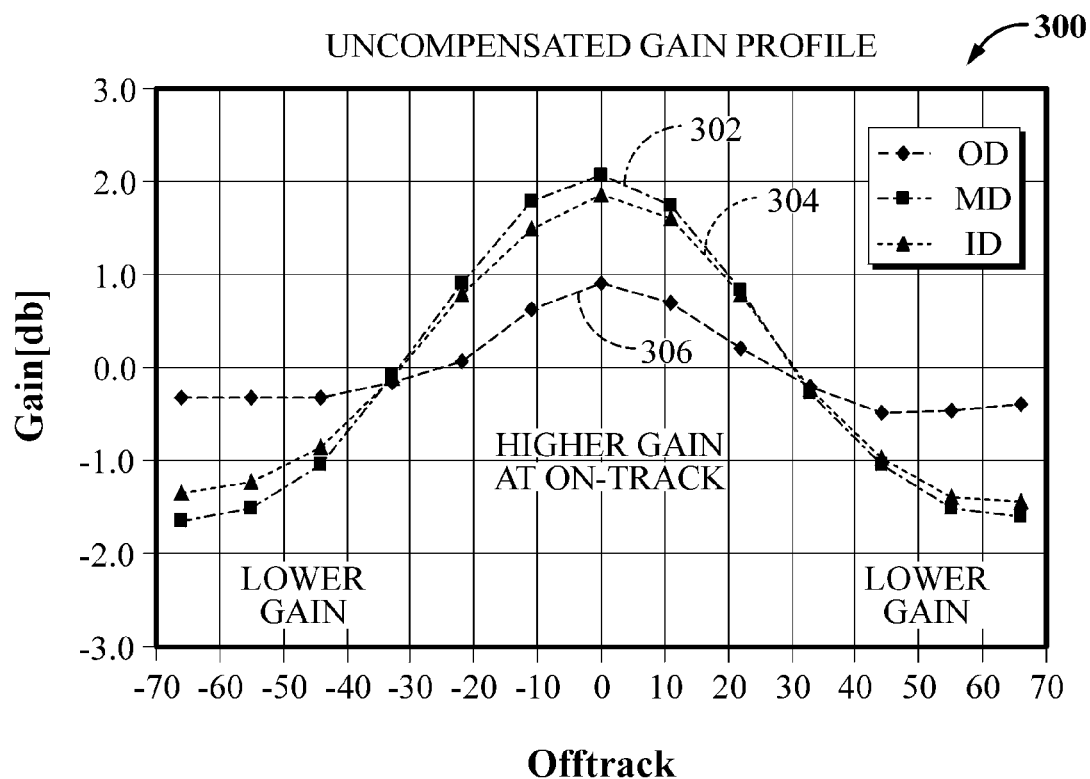
FIG. 3A is a graph that illustrates uncompensated off-track gain profiles for a class of disk drives.

FIG. 3A is a graph 300 that illustrates uncompensated off-track gain profiles for a class of disk drives. As can be seen in FIG. 3A, off-track gain profiles are characterized in terms of off-track gain in decibels (db) [y-axis] versus off-track micro-jog position [x-axis] from track center (0). The x-axis represents generalized servo zones in terms of micro-jog position from track center (0). As is known in the art, servo zones are often defined for use in seeking and track following. One particular implementation of the use of servo zones that may be utilized with embodiments of the invention are servo zones described in U.S. Pat. No. 6,995,941 issued to the present Assignee, Western Digital Technologies, Inc. In this implementation, a servo zone is defined as being 64 micro-jogs and eight servo zones are defined across two tracks having a total 512 micro-jog distance. These servo zones will be discussed in more detail later.

As shown in FIG. 3A, for all of the off-track gain measurements at the middle diameter (line 302), the inner diameter (line 304), and the outer diameter (line 306), all show that the maximum off-track gain (i.e., the highest gain) is directly on-track at zero micro-jogs, and that the off-track gains become lower towards the ends of the servo zones (i.e., all of the gains begin to become negative). Moreover, as can be seen by lines 302, 304, 306, the amount of off-track gain is dependent upon whether the servo zone is at the middle diameter, inner diameter, or outer diameter of the disk.

By the use of a sinusoidal position linearity correction function, the off-track gain may be reduced at track center (0) micro-jogs and increased at the ends of the servo zones. Thus, with a sinusoidal correction function, the off-track gain may be reduced and position linearity improved.

In particular, by applying a pre-determined position linearity correction (i.e., default compensation) into the servo controller's track following loop, off-track gain variation may be accounted for and off-track position linearity improved. This type of sinusoidal based pre-determined position linearity correction may be configured by coefficients and used to improve position linearity in track following. This pre-determined compensation is effective, because as previously shown with respect to FIG. 3A, a class of disk drives can be effectively characterized to show consistent and predictable behavior. As previously shown with respect to FIG. 3A, higher off-track gains are found at the on-track region and off-track gains decrease away from the on-track region.

An example of a suitable position linearity correction function will now be discussed. A suitable $5^{th}$ order sinusoidal polynomial for position linearity correction C(x) may be as shown below:

$$C(x)=A1\cos(wx)+B1\sin(wx)+A2\cos(2wx)+B2\sin(2wx)+\ldots+A5\cos(5wx)+B5\sin(5wx)$$

A pre-determined position linearity correction function may be generated from C(x) with the following properties: 1) reduced gain at the on-track region; 2) a profile that is symmetric about the on-track region; and 3) a compensation profile that may be controlled by two coefficients, B1 and B2. Based upon these properties, a suitable pre-determined position linearity correction function Cpre(x) may be as shown below:

$$Cpre(x)=B1\sin(wx)+B2\sin(2wx)$$

Servo position correction coefficients (B1 and B2) may be determined by a disk drive designer for the linear correction function Cpre(x)=B1 sin(wx)+B2 sin(wx) to compensate for the off-track gain variation for the class of disk drive. In this equation x represents head position and w represents a conversion factor. Further, w is defined as $2\pi/T$, wherein T is the distance of a servo zone. Alternatively, T may be the distance of two servo zones in which x is equal to +/−64 micro-jogs and T is equal to 128 micro-jogs.

Figure 3B:
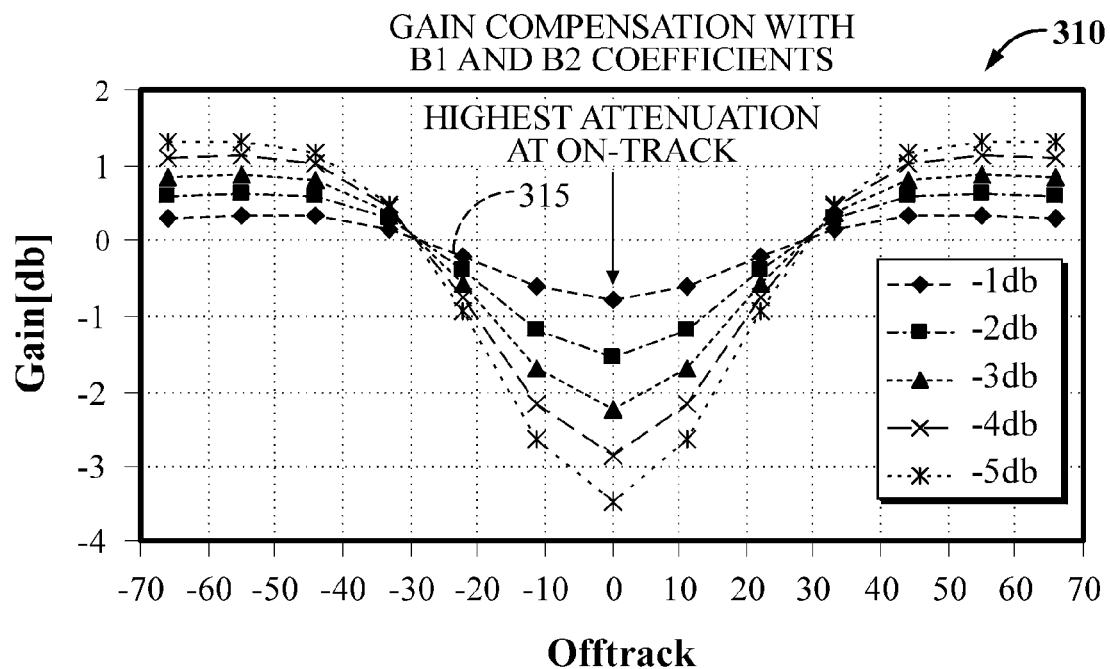
FIG. 3B is a graph that illustrates the shapes and magnitudes of pre-determined position linearity correction functions Cpre(x) for default gains based upon selected servo position correction coefficients.

FIG. 3B is a graph 310 illustrating the shapes and magnitudes of pre-determined position linearity correction functions Cpre(x) for default gains based upon selected B1 and B2 servo position correction coefficients. Again, the y-axis represents gain(db) and the x-axis shows off-track positions from track center (0) in micro-jogs. The B1 and B2 coefficients may be determined by inverting the off-track gain profiles shown in FIG. 3A then performing a curve fit to determine the B1 and B2 coefficients. For example, the inversion of the off-track gain profile g(x) may be may be found by the inversion function: 1/g(x)−1. The table below illustrates examples of various default gains of 1 db, 2 db, 3 db, 4 db, and 5 db and their associated servo position correction coefficients (B1 and B2) for the curves illustrated in FIG. 3B. These values may be scaled by a factor of 2048 to avoid time-intensive floating point operations at the firmware level, as is well known in the art. In another embodiment, the coefficients B1 and B2 are determined and selected based on a predicted rather than a measured or simulated off-track gain profile for a class of disk drives.

| default gain | 1 db | 2 db | 3 db | 4 db | 5 db |
| --- | --- | --- | --- | --- | --- |
| B1Def-PEComp | −2692.86 | −5046.90 | −7132.15 | −8999.35 | −10686.381 |
| B2Def-PEComp | −484.97 | −852.72 | −1133.09 | −1346.77 | −1508.61 |

As can be seen in FIG. 3B, line 315 having a default gain of 1 db provides the closest attenuation to match line 306 of FIG. 3A which is the off-track gain at the outer diameter (OD). Because the reserved track is at the OD, a disk drive designer would select the 1 db default gain (and corresponding B1 and B2 coefficients) to match the uncompensated off-track gain illustrated by line 306 (FIG. 3A) for a reserved track at the OD.

Figure 3C:
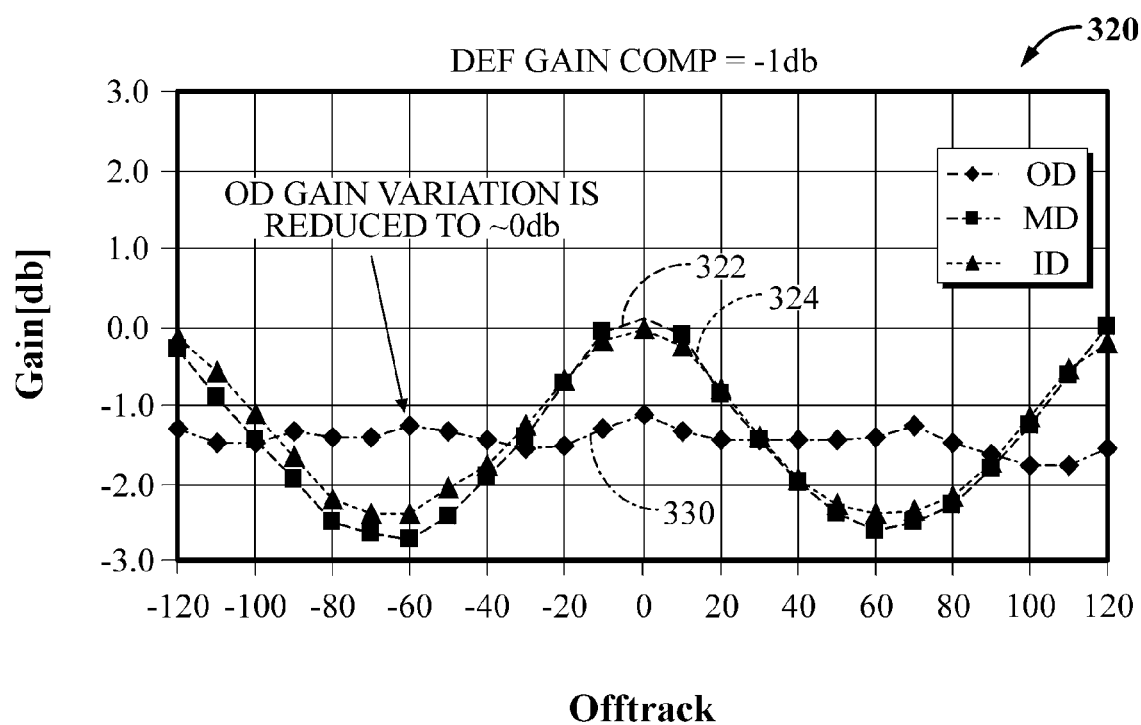
FIG. 3C is a graph that illustrates the application of the pre-determined linear correction equation Cpre(x).

Based upon these selected servo position correction coefficients (B1 and B2) a −1 db gain may be applied as shown in FIG. 3C. FIG. 3C is a graph 320 showing the effects of the application of the predetermined linear correction equation Cpre(x) with these coefficients. As can be seen in FIG. 3C, the off-track gain variation is reduced across the servo zones for the middle diameter, inner diameter, and outer diameter shown by lines 322, 324, and 330, respectively. However, in particular, it is shown that the outer diameter (OD) off-track gain variation is reduced to almost zero db utilizing the −1 db compensation.

Since the reserved track is at the outer diameter of the disk, these servo position correction coefficients (B1 and B2) for the pre-determined linear correction equation to apply the −1 db off-track gain compensation may be selected by a disk drive designer to allow for track following on the reserved track of the disk at the outer diameter (OD) with the pre-characterized off-track gain being almost completely accounted for.

Thus, after characterizing the off-track gain variation for the class of disk drives as discussed with reference to FIGS. 3A-3C, this process allows a disk drive designer to determine that the servo position correction coefficients (B1, B2) imparting −1 db gain, as shown in FIG. 3C are best for compensating for the off-track gain variation for the class of disk drives, such that there is almost no off-track gain variation during track following at the reserved track at the OD of the disk.

It should be appreciated that many different types of sinusoidal-based linear equations with differing coefficients may be utilized and that the previously-described equations are only exemplary.

In one embodiment, the selected servo position correction coefficients (B1, B2) for the class of disk drives would then be coded into the firmware of the servo controller for each disk drive. The servo controller then implements the firmware during power-up to: calculate servo position correction values using the set of programmed servo position correction coefficients (B1 and B2) that have been pre-selected for the disk drive; store the servo position correction values in a pre-determined servo position correction look-up table in memory; and then utilize the pre-determined servo position correction look-up table to track follow on the reserved track of the disk at the outer diameter (OD) of the disk to perform initialization and calibration functions.

In one embodiment, the pre-determined servo position correction look-up table may be populated with values I(x) corresponding to a linear compensation equation of the form: I(x)=y(x)+Cpre(y(x)); wherein I(x) is the ideal linearly compensated position, y(x) is a measured position [used as the index into the table], and Cpre(y(x)) is the linearity correction applied by the pre-determined linear correction equation Cpre(y(x))=B1 sin(wy(x))+B2 sin(2wy(x)). Accordingly, a suitable pre-determined look-up table of I(x) values based upon Cpre(x) may be generated for a generalized servo zone and stored in memory. Further, based upon a measured position y(x) and the pre-determined linear correction equation Cpre(y(x)), the linearly compensated ideal position (I(x)) may be outputted from the look-up table for use in PES determination and track following on the reserved track at the OD, as will be more particularly described hereinafter.

Figure 4:
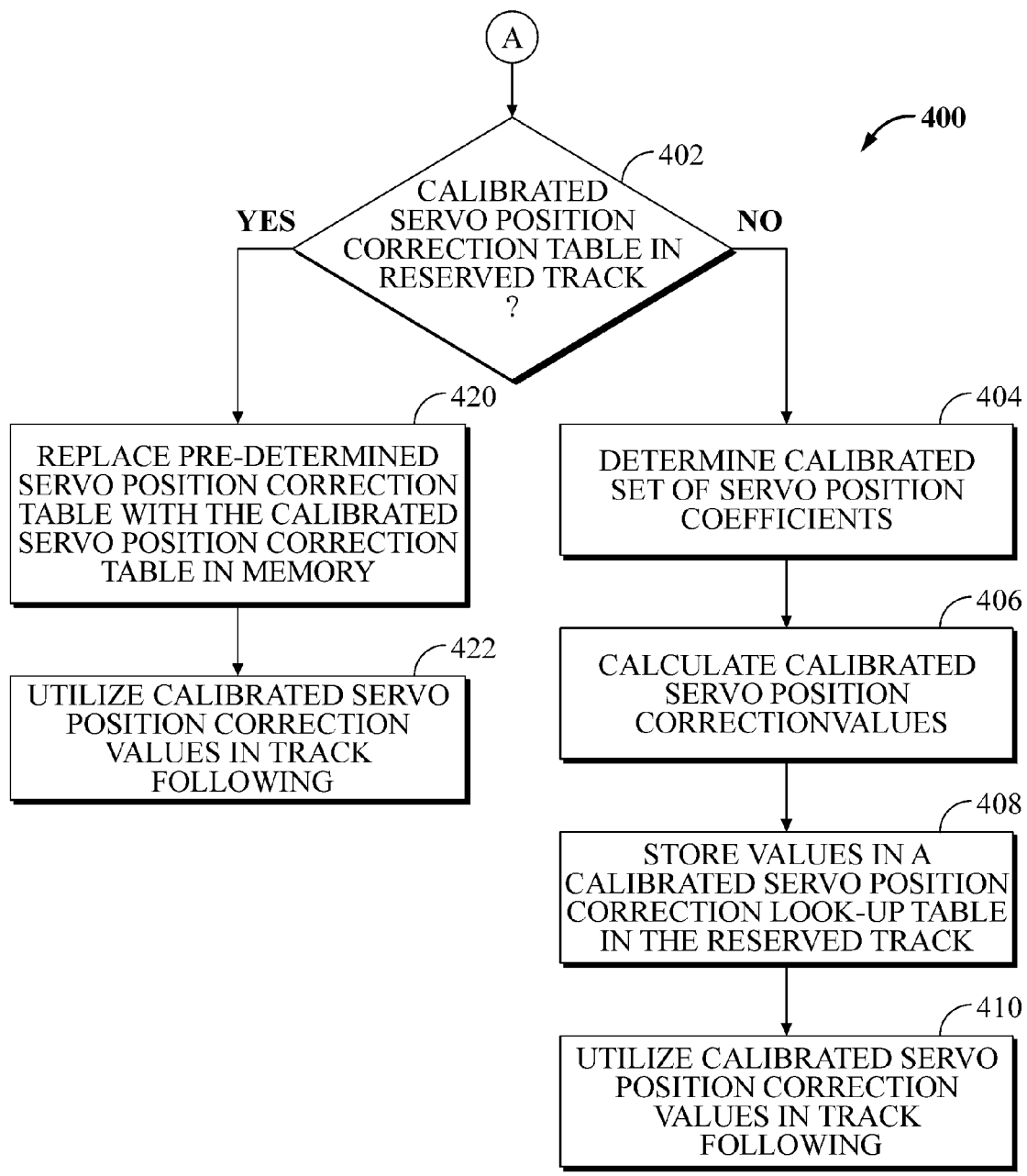
FIG. 4 is a flow diagram illustrating a process for determining whether a calibrated servo position correction table is in the reserved track, according to one embodiment of the invention.

FIG. 4 is a flow diagram illustrating a process 400 for determining whether a calibrated servo position correction table is in the reserved track. After track following on the reserved track utilizing the pre-determined servo position correction look-up table, the servo controller determines whether or not a calibrated servo position correction table is present in the reserved track (block 402). If there is not a calibrated servo position correction table in the reserved track, the servo controller continues to use the pre-determined servo position correction look-up table to track follow on the reserved track and other tracks to characterize the off-track gain variation for that disk drive and determine a calibrated set of servo position coefficients specific for the disk drive (block 404).

This calibration may occur during the manufacture of the disk drive when the disk drive is connected to the test computer equipment and is being calibrated. In particular, based upon the characterization, the servo controller determines a calibrated set of servo position coefficients based upon the linear correction function C(x) previously discussed, and shown below:

$$C(x)=A1\cos(wx)+B1\sin(wx)+A2\cos(2wx)+B2\sin(2wx)+\ldots+A5\cos(5wx)+B5\sin(5wx)$$

The servo controller may calculate new calibrated servo position correction values (block 406) based upon the complete linear correction equation C(x) by calculating the off-track gain variation for a generalized servo zone using the pre-determined look-up table [based upon Cpre(x)] for track following and determines a complete set of appropriate coefficients A1-A5 and B1-B5 for the appropriate attenuation. The new B1 and B2 coefficients may be adjusted because the pre-determined B1 and B2 coefficients were used for track following when generating the new B1 and B2 coefficients. Thus, the new B1 coefficient may be increased by the predetermined B1 coefficient and the new B2 coefficient may be increased by the predetermined B2 coefficient. In an alternative embodiment, the servo controller may calculate new calibrated servo position correction values solely based on the linear correction equation Cpre(x).

Based upon the linear correction equation C(x) and the calibrated servo position coefficients (A1-A5, B1-B5), the calibrated servo position correction values are calculated (block 406) and the calibrated servo position correction values are stored in a calibrated servo position correction look-up table in the reserved track (block 408). The pre-determined servo position correction table is then replaced with the calibrated servo position correction look-up table in memory. The calibrated servo position correction values from the calibrated servo position correction look-up table are then utilized in track following (block 410).

However, if the calibrated servo position correction table is already in the reserved track when the disk drive is powered-on and initializing (block 402), then the pre-determined servo position correction table is simply replaced with the calibrated servo position correction table in memory (block 420). The calibrated servo position correction values from the calibrated servo position correction table are then utilized in track following (block 422).

Figure 5:
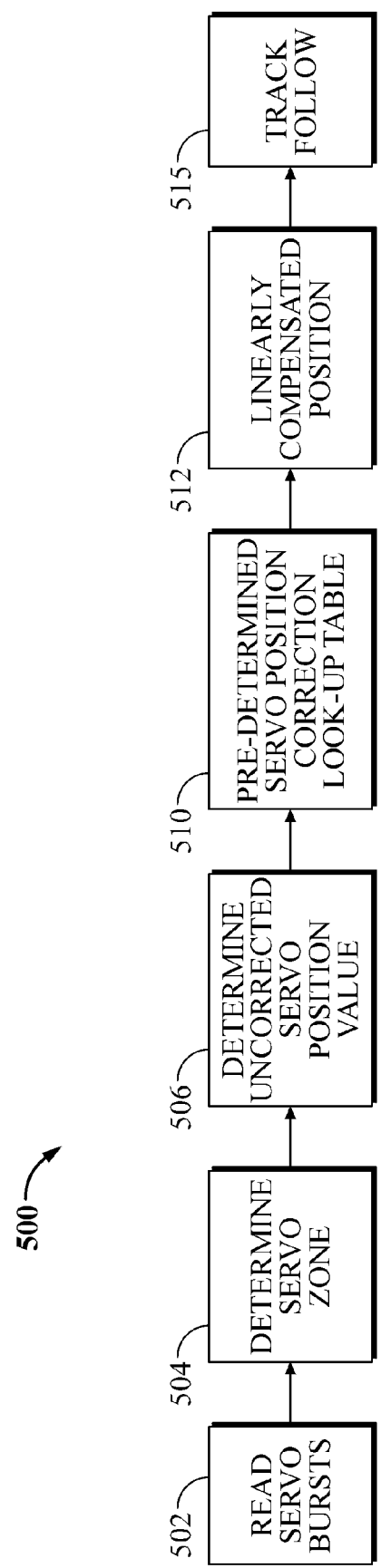
FIG. 5 is a flow diagram illustrating a process by which the pre-determined servo position correction look-up table is utilized to track follow on the reserved track of the disk drive, according to one embodiment of the invention.

FIG. 5 is a flow diagram illustrating a process 500 by which the pre-determined servo position correction look-up table is utilized to track follow on the reserved track of the disk drive, according to one embodiment of the invention. In accordance with process 500, servo bursts are read (block 502), a servo zone is determined (block 504), and an uncorrected servo position value is determined (block 506).

Figure 6:
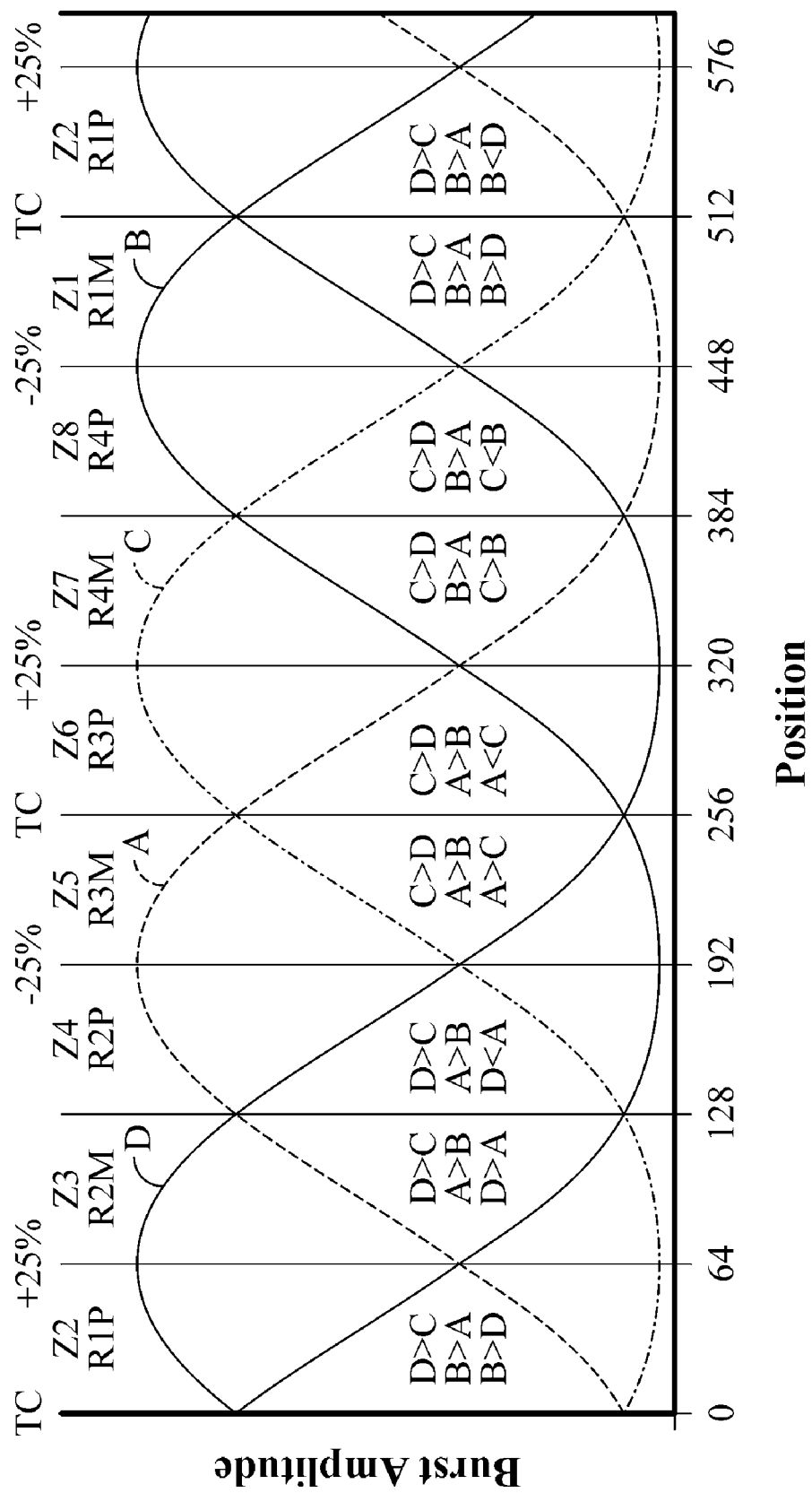
FIG. 6 is a graph illustrating an example of eight different servo zones defined across two track widths (i.e., from 0 to 512 micro-jogs on the x-axis) and the amplitudes of the servo bursts (A, B, C, D) (y-axis) across the servo zones.

In one embodiment, as previously discussed, servo burst and servo zone definition as well as servo zone and servo position value determination may be accomplished in accordance with U.S. Pat. No. 6,995,941. As described therein, the amplitudes of read servo bursts (e.g., A, B, C, D) are compared to first determine a radial servo position zone. In the '941 patent, eight servo zones are defined spanning two track lengths. This can be seen with reference to FIG. 6, reproduced from the '941 patent, which illustrates eight different servo zones defined across two track widths of (i.e., from 0 to 512 micro-jogs on the x-axis) and the amplitudes of the servo bursts (A, B, C, D) (y-axis) across the servo zones. An uncorrected servo position value may be calculated based upon the read servo bursts (e.g., A, B, C, D) and various burst ratios in accordance with position equations set forth in the '941 patent. In this example, the uncompensated servo position values (where k=64) may be determined as follows:

If within $1^{st}$ or $5^{th}$ servo zone, then y(x)=uncompensated servo position value=k(A−D−C+D)/(−A+B);

If within $2^{nd}$ or $6^{th}$ servo zone then y(x)=uncompensated servo position value=k(A−B−C+D)/(−C+D);

If within $3^{rd}$ or $7^{th}$ servo zone then y(x)=uncompensated servo position value=k(A−B+C−D)/(−C+D); and If within $4^{th}$ or $8^{th}$ servo zone then y(x)=uncompensated servo position value=k(−A+B−C+D)/(−A+B)

The servo controller utilizes the determined uncorrected servo position value y(x) as an index into the pre-determined servo correction look-up table (block 510), and finds a linear compensated servo position value (block 512) and this value is used to determine a position error signal (PES) for use in track following 515. The use of PES values in track following is well known in the art.

In one embodiment, the pre-determined servo position correction look-up table may be populated with values corresponding to linear compensation equation of the form: I(x)=y(x)+Cpre(y(x)); wherein I(x) is the ideal linearly compensated position, y(x) is the measured position [used as the index to the table], and Cpre(y(x)) is the linearity correction applied by the pre-determined linear correction equation Cpre(y(x))=B1 sin(wy(x))+B2 sin(2wy(x)), as previously described.

Thus, based upon the measured position y(x) [used as index into the table], the pre-determined servo correction look-up table (block 510) outputs the linearly compensated position (I(x)) (block 512) which is then used in PES determination and track following (block 515).

Thus, utilizing the pre-determined servo position correction look-up table, the off-track gain variation for the class of disk drives can be compensated for upon power-up and initialization such that the servo controller of the disk drive can properly track follow on the reserved track of the disk to accomplish initialization and calibration functions.

Further, after it is determined that a calibrated servo position correction table is present on the reserved track, then the pre-determined servo position correction look-up table 510 is replaced in memory with the calibrated servo burst correction table and the calibrated servo position correction values are utilized in track following, as previously described. In this instance, the process flow of FIG. 5 is the same as that as previously described, however, instead of the pre-determined servo position correction look-up table 510 based upon Cpre (x) for determining linearly compensated positions, the full equation: C(x)=A1 cos(wx)+B1 sin(wx)+A2 cos(2wx)+B2 sin(2wx)+ . . . +A5 cos(5wx)+B5 sin(5wx); is utilized.

The techniques previously described can be employed for disk drives with embedded servo systems. However, numerous alternatives for disk drives of similar or other media format characteristics can be employed by those skilled in the art to use the invention with equal advantage to implement these techniques. Further, although embodiments have been described in the context of a disk drive with embedded servo sectors, the invention can be employed in many different types of disk drives having a head actuator that scans the media. It should also be appreciated that although techniques disclosed herein have been described with particular linear compensation position equations with particular coefficients, that a wide variety of differing types of linear position compensation equations may be utilized.

What is claimed is:

1. A method for providing pre-determined servo position correction values for use in initializing a disk drive comprising:
   selecting a set of servo position correction coefficients for a class of disk drives;
   coding firmware for the class of disk drives with the selected set of servo position correction coefficients;
   during a power-up for a disk drive from the class of disk drives,
   calculating servo position correction values using the selected set of servo position correction coefficients;
   storing the servo position correction values in a pre-determined servo position correction look-up table in memory; and
   utilizing the pre-determined servo position correction look-up table to track follow on a reserved track of the disk drive.

2. The method of claim 1, wherein selecting the set of servo position correction coefficients for a class of disk drives is based upon characterizing off-track gain variation for the class of disk drives and determining servo position correction coefficients to compensate for the off-track gain variation for the class of disk drives.

3. The method of claim 2, wherein determining servo position correction coefficients to compensate for the off-track gain variation for the class of disk drives comprises determining the coefficients B1 and B2 from the linear correction equation Cpre(x)=B1 sin(wx)+B2 sin(2wx), where x represents a head position and w represents a conversion factor.

4. The method of claim 3, wherein w=2π/T, wherein T is the distance of a servo zone.

5. The method of claim 1, further comprising:
   determining that the reserved track does not contain a calibrated servo position correction look-up table;
   characterizing an off-track gain variation for the disk drive by utilizing the pre-determined servo position correction look-up table; and
   determining a calibrated set of servo position correction coefficients to compensate for the off-track gain variation for the disk drive.

6. The method of claim 5, further comprising calculating calibrated servo position correction values based on the calibrated set of servo position correction coefficients.

7. The method of claim 6, further comprising storing the calibrated servo position correction values in a calibrated servo position correction look-up table in the reserved track.

8. The method of claim 5, wherein one or more of the calibrated servo position correction coefficients are adjusted based on one or more of the selected servo position correction coefficients.

9. The method of claim 1, further comprising:
   determining that the reserved track contains a calibrated servo position correction look-up table; and
   replacing the pre-determined servo position correction look-up table with the calibrated servo position correction look-up table in memory.

10. The method of claim 1, wherein utilizing the pre-determined servo position correction look-up table to track follow on a reserved track on the disk drive comprises:
    reading servo bursts;
    generating a raw servo burst ratio to determine an uncorrected servo position value; and utilizing the uncorrected servo position value as an index into the pre-determined look-up table, the pre-determined look-up table providing a servo position correction value for use in track-following.

11. The method of claim 10, wherein the generation of a raw servo burst ratio includes determining a servo zone.

12. A disk drive comprising:
a moveable head;
a disk having a plurality of tracks; and
a servo controller to control track following operations with the moveable head, a substantial majority of the tracks having a plurality of servo sectors utilized in track following operations, the servo controller implementing a program during power-up to:
calculate servo position correction values using a set of servo position correction coefficients that have been pre-selected for the disk drive based upon a class of disk drives, the set of servo position correction coefficients being coded into the program;
store the servo position correction values in a pre-determined servo position correction look-up table in memory; and
utilize the pre-determined servo position correction look-up table to track follow on a reserved track of the disk.

13. The disk drive of claim 12, wherein the set of servo position correction coefficients are selected for the class of disk drives based upon characterizing the off-track gain variation for the class of disk drives and determining servo position correction coefficients to compensate for the off-track gain variation for the class of disk drives.

14. The disk drive of claim 13, wherein determining servo position correction coefficients to compensate for the off-track gain variation for the class of disk drives comprises determining the coefficients B1 and B2 from the linear correction equation $Cpre(x)=B1 \sin(wx)+B2 \sin(2wx)$, where x represents a head position and w represents a conversion factor.

15. The disk drive of claim 14, wherein $w=2\pi/T$, wherein T is the distance of a servo zone.

16. The disk drive of claim 12, wherein the servo controller under the control of the program further:
determines that the reserved track does not contain a calibrated servo position correction look-up table;
characterizes an off-track gain variation for the disk drive by utilizing the pre-determined servo position correction look-up table; and
determines a calibrated set of servo position correction coefficients to compensate for the off-track gain variation for the disk drive.

17. The disk drive of claim 16, wherein the servo controller under the control of the program further calculates calibrated servo position correction values based on the calibrated set of servo position correction coefficients.

18. The disk drive of claim 17, wherein the servo controller under the control of the program further stores the calibrated servo position correction values in a calibrated servo position correction look-up table in the reserved track.

19. The disk drive of claim 16, wherein one or more of the calibrated servo position correction coefficients are adjusted based on one or more of the selected servo position correction coefficients.

20. The disk drive of claim 12, wherein the servo controller under the control of the program further:
determines that the reserved track contains a calibrated servo position correction look-up table; and
replaces the pre-determined servo position correction look-up table with the calibrated servo position correction look-up table in memory.

21. The disk drive of claim 12, wherein utilizing the pre-determined servo position correction look-up table to track follow on a reserved track on the disk drive further comprises the servo controller under the control of the program to further:
read servo bursts;
generate a raw servo burst ratio to determine an uncorrected servo position value; and
utilize the uncorrected position value as an index into the pre-determined look-up table, the pre-determined look-up table providing a servo position correction value for use in track-following.

22. The disk drive of claim 21, wherein the generation of a raw servo burst ratio includes determining a servo zone.

23. A disk drive, comprising:
a means for calculating and storing a pre-determined look up table in response to a set of predetermined coefficients for a class of disk drives, the pre-determined look up table comprising servo position correction values;
a means for track following on a reserved track using the pre-determined look up table; and
a means for creating an off-track gain profile for the disk drive and for creating a calibrated look up table in response to the off-track gain profile, the calibrated look up table comprising calibrated servo position correction values.

* * * * *